United States Patent [19]

Knox

[11] Patent Number: 4,613,140
[45] Date of Patent: Sep. 23, 1986

[54] SELF-ALIGNING LUBRICATING STUFFING BOX

[76] Inventor: Gary W. Knox, P. O. Box 124, Langley, Okla. 74350

[21] Appl. No.: 661,666

[22] Filed: Oct. 17, 1984

[51] Int. Cl.⁴ .................... F16J 15/18; F16J 15/48
[52] U.S. Cl. .................................... 277/3; 277/15; 277/24; 277/29; 277/59; 277/72 R
[58] Field of Search ............... 277/3, 15, 22, 24, 27, 277/29, 30, 59, 71, 72 R, 72 FM, 73, 74, 79

[56] References Cited

U.S. PATENT DOCUMENTS

| | | | |
|---|---|---|---|
| 2,307,346 | 1/1943 | Allen | 277/29 |
| 2,824,759 | 2/1958 | Tracy | 277/15 |
| 2,965,398 | 12/1960 | Keller et al. | 277/15 X |
| 3,019,739 | 2/1962 | Prosser | 277/3 X |
| 3,216,731 | 11/1965 | Dollison | 277/3 X |
| 4,055,107 | 10/1977 | Bartley | 277/24 X |
| 4,136,886 | 1/1979 | Sjoholm et al. | 277/72 R X |
| 4,272,084 | 6/1981 | Martinson et al. | 277/3 X |
| 4,431,199 | 2/1984 | Iwane | 277/3 |
| 4,466,619 | 8/1984 | Adams | 277/22 X |

FOREIGN PATENT DOCUMENTS

| | | | |
|---|---|---|---|
| 878900 | 8/1971 | Canada | 277/29 |
| 305811 | 5/1955 | Switzerland | 277/29 |

Primary Examiner—Robert S. Ward
Attorney, Agent, or Firm—Head, Johnson & Stevenson

[57] ABSTRACT

A self-aligning and self-lubricating stuffing box for oil well polish rods, pump rods and the like, and comprising a housing disposed around the outer periphery of the rod and having an internal cooling chamber surrounding the outer periphery of the rod for retaining a fluid reservoir in engagement with the rod for an efficient lubrication thereof, at least one valved internal passageway provided in the housing for automatically directing the fluid to and/or from the cooling chamber as required during the operation of the polish rod during a well fluid production process, at least two longitudinally spaced bushing members disposed in the housing and in engagement with the outer periphery of the rod for assuring an efficient axial alignment between the housing and the rod during the reciprocation of the rod, and a swivel connection for overcoming any misalignment between the pump jack and the pumping "T" during the well production operation.

16 Claims, 6 Drawing Figures

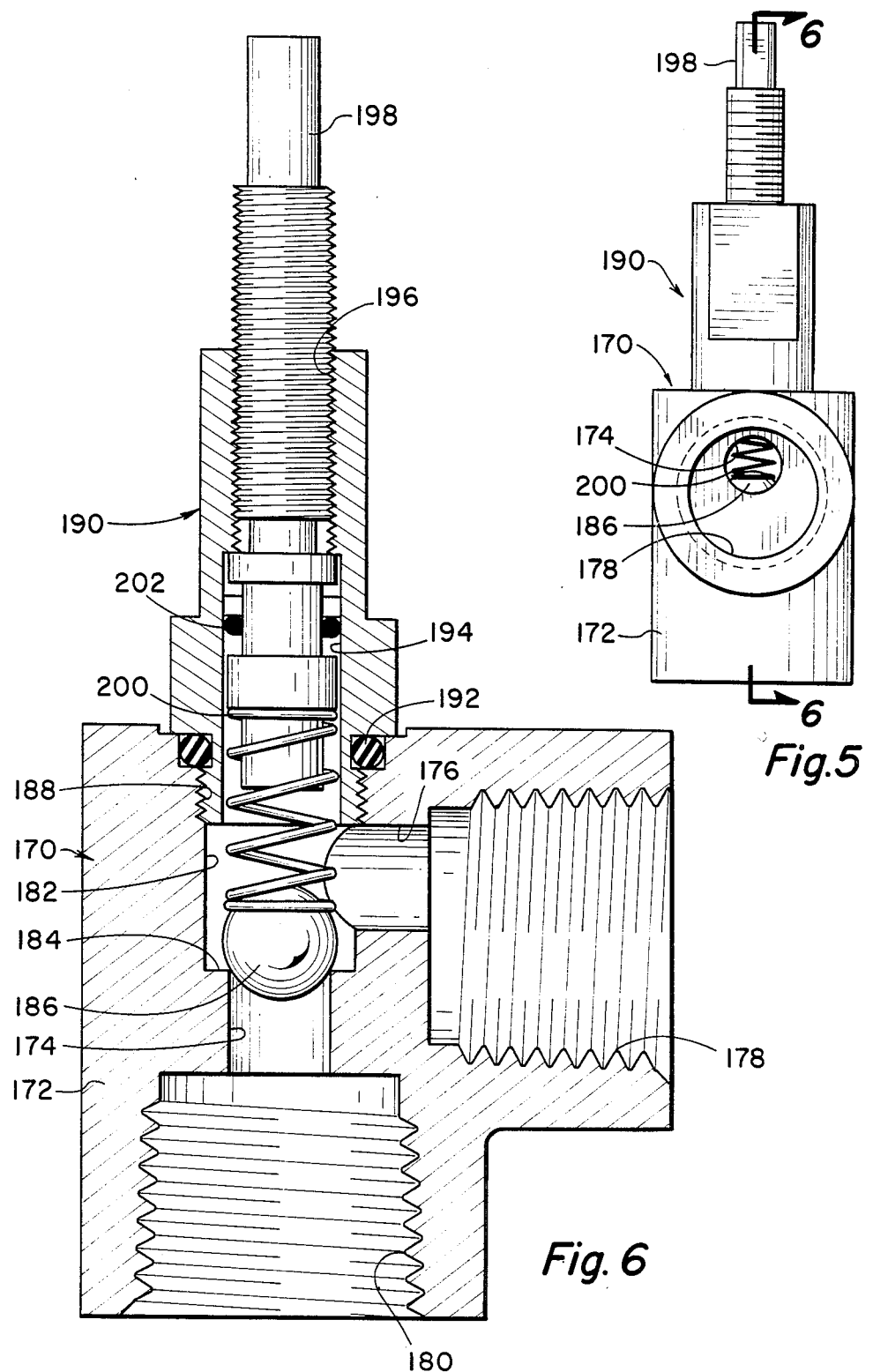

SELF-ALIGNING LUBRICATING STUFFING BOX

CROSS-REFERENCE TO RELATED APPLICATIONS

This application is related to application Ser. No. 483,101, filed April 8, 1983 and now abandoned, entitled "Self-Aligned Polish Rod Stuffing Box" and of which applicant is a co-inventor.

BACKGROUND OF THE INVENTION

1. Field of the Invention

This invention relates to improvements in stuffing boxes and more particularly, but not by way of limitation, to a self-aligning, self-lubricating stuffing box for either reciprocating polish rods of producing oil and/or gas well bores, or the like or with rotatable pump rods.

2. Description of the Prior Art

Many producing oil and/or gas well bores are provided with down-hole pumping apparatus operable for elevating the well fluids to the surface of the ground. The usual down-hole pumping apparatus is actuated by a surface mounted pump jack assembly which is connected with the down-hole pump by a polish rod or sucker rod string which extends longitudinally through the well bore into connection with the pump means. The reciprocation of the sucker rod string or polish rod by the pump jack actuates the pump for elevating the well fluids through the well tubing for delivery through the usual pumping "T" for recover of the fluids. It is common practice to install stuffing box around the outer periphery of the polish rod above the pumping "T" for precluding loss of the well fluids around the outer periphery of the polish rod. The stuffing box is normally provided with packing means engageable with the outer periphery of the polish rod, and as the polish rod reciprocates with respect to the packing means, considerable friction may be generated between the polish rod and the packing. It is important that an efficient lubrication of the packing means be achieved in order to reduce damage of the packing means by the frictional heat generated.

The normal stuffing box in widespread use today normally comprises a housing surrounding the outer periphery of the polish rod for containing the packing members and usually includes means for adjusting the pressure of the packing members against the outer periphery of the polish rod. In the event there is any misalignment between the pumping "T" and the pump jack, damage may occur, and it is advantageous to correct any misalignment for improving the overall fluid producing operation. At the present time this misalignment is usually corrected by squeezing the packing sufficiently to force the polish rod into proper alignment, or to squeeze the packing around one side of the rod to prevent leakage of fluid. This solution to the problem frequently results in damage or accidental destruction of the packing means when the pump jack is shut down and the polish rod string is suspended therefrom. In addition, the fluid weight on the packing gland may compress the packing excessively, squeezing out any lubricant which may be present in the packing. As a result the packing is frequently damaged upon a "start up" of the pump jack.

The Reeves U.S. Pat. No. 3,468,374, issued Sept. 23, 1969, and entitled "Self-Cooled Oil Well Polish Rod Stuffing Box" has been devised to overcome the problem developed by frictional heat or inadequate lubrication of the stuffing box. The Reeves stuffing box includes a cooling surrounding the polish rod and interposed between upper and lower packing glands for assuring an adequate supply of lubricating fluid for the rod during reciprocation thereof. The Reeves device, however, has not addressed the problem of misalignment between the pump jack and the pumping "T". Accordingly, the improvement of the aforementioned application Ser. No. 483,101, incorporates a swivel connection and alignment bushings in combination with the improved lubrication system of the Reeves patent. One disadvantage of the Reeves lubrication system, however, is the fact that the fluid supply line and fluid return line between the cooling chamber and the lubricant source are both disposed exteriorly of the stuffing box housing and in some installations these exterior conduits or hoses are subject to damage during the operation conditions of the stuffing box.

SUMMARY OF THE INVENTION

The present invention contemplates a novel self-aligning, self-lubrication stuffing gland which has been particularly designed and constructed for overcoming the foregoing disadvantages. The novel stuffing box comprises a housing having a cooling chamber disposed around the outer periphery of the polish rod for retaining a suitable lubricant reservoir in intimate contact with the polish rod for assuring and efficient and prolonged useful life for the packing means. A first packing means is disposed in the housing in the proximity of the upper end of the cooling chamber for precluding accidental leakage of fluid from the upper end of the stuffing box. A second packing means is disposed in the housing in the proximity of the lower end of the cooling chamber and is particularly arranged for permitting the passage of the well fluid upwardly around the outer periphery of the polish rod and into the cooling chamber while precluding the flow of the fluid downwardly from the cooling chamber. A packing follower means is threadedly secured in the housing for supporting the lowermost or second packing means and is provided with port means establishing communication between the interior of the housing beneath the second packing means and the well bore. At least one radially outwardly extending flange or ear means is secured on the outer periphery of the housing and is provided with internal passageway means providing communication between the cooling chamber and the housing portion below or beneath the second packing means and thus establishing communication between the cooling chamber and the well fluid. Spring urged valve means is provided in the internal passageway means for precluding loss of the lubricant from the cooling chamber as long as the well fluid pressure in combination with the spring pressure is greater than the pressure in the cooling chamber. The valve means, however, permits relief of any excessive pressure in the cooling chamber by opening the communication between the cooling chamber and the well bore. In addition, a swivel connection means is connected between the packing follower means and the pumping "T" to permit or provide for axial alignment stuffing box between the pumping "T" and the pump jack as set forth in the aforementioned co-pending application. In order to maintain the housing in an aligned concentric relation with respect to the polish rod, a pair of spaced bushing sleeves are interposed between the outer periphery of the polish rod and the stuffing box whereby a proper alignment between the two is maintained during the reciprocation of the polish rod. A still further improvment of the stuffing box of the invention includes wiping means installed around the outer periphery of the polish rod and outboard of the uppermost packing means for substantially precluding the entry or passage of sand or other foreign particles into the packing means for protection of the packing means against abrasive damage. The novel stuffing box is simple and efficient in operation and economical and durable in construction.

BRIEF DESCRIPTION OF THE DRAWINGS

FIG. 5 is a side elevational view of a fluid valving arrangement which may be utilized in a stuffing box having external lubricant supply means.

FIG. 6 is an enlarged view taken on line 6—6 of FIG. 5.

DETAILED DESCRIPTION OF THE PREFERRED EMBODIMENTS

Figure 1:
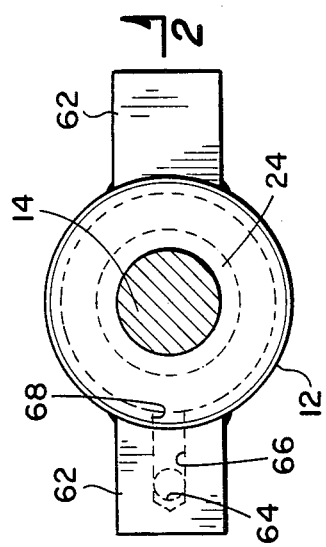
FIG. 1 is a top view of a stuffing box embodying the invention and illustrated as installed on a polish rod.
Figure 2:
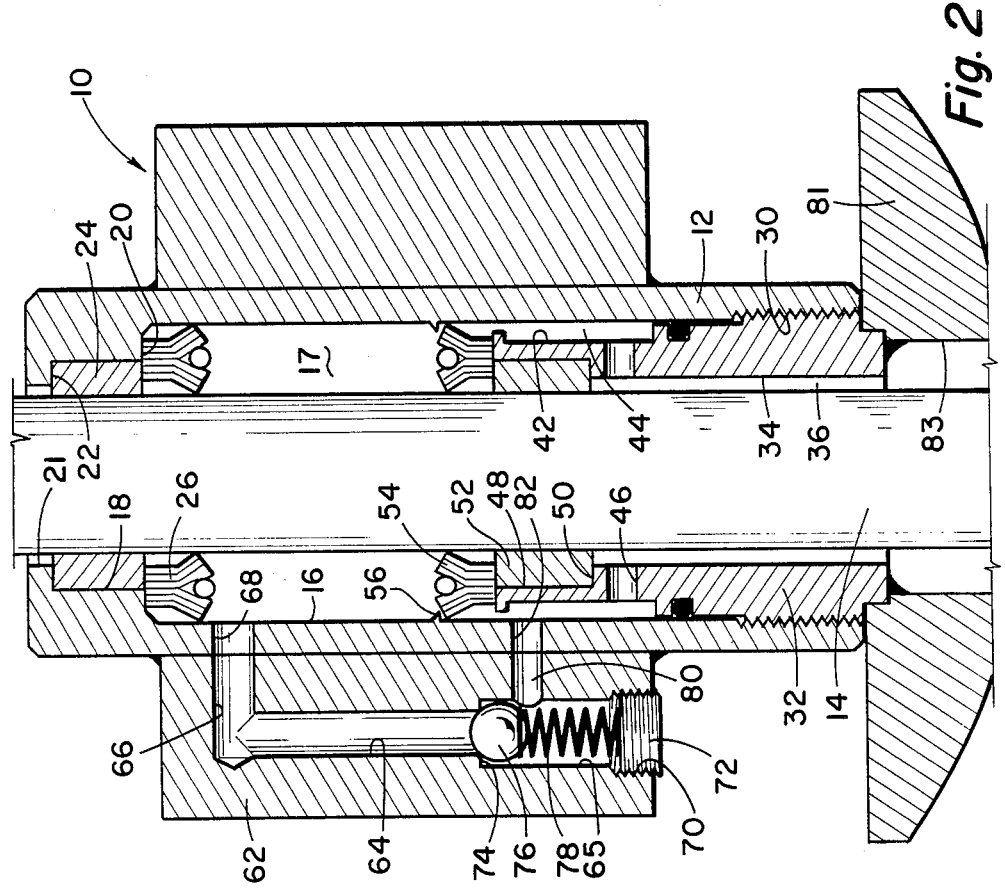
FIG. 2 is a view taken on line 2—2 of FIG. 1.

Referring to FIGS. 1 and 2, reference character 10 generally indicates a stuffing box comprising a housing 12 adapted to be disposed around the outer periphery of a polish rod 14. The housing 12 is provided with a central bore 16 concentrically arranged with respect to the outer periphery of the polish rod 14 to form a cooling chamber 17 therearound. The bore 16 is reduced at 18 in the proximity of one end of the housing 12 to provide an inwardly directed annular shoulder 20 and is further reduced at 21 for receiving the polish rod 14 therethrough. An annular shoulder 22 is provided in spaced relation with respect to the shoulder 20 and conterminous with the bore 21 for receiving one end of a bushing sleeve 24 thereagainst. The bushing 24 is retained in position against the shoulder 22 by a suitable packing means 26 as particularly shown in FIG. 2 and in a manner as will be hereinafter set forth. The packing means 26 is a commercially available member and is a single lip pressure packing means whereby the outer periphery of the packing 26 engages the inner periphery of the bore 16 and the inner periphery of the packing 26 engages the outer periphery of the polish rod 14 for precluding leakage of fluid at the upper end of the housing 12.

The opposite end of the housing 12 is internally threaded as shown at 30 for receiving a packing follower means or inner sleeve 32 therein. The sleeve means 32 is provided with a longitudinally extending central bore 34 concentrically disposed around the outer periphery of the polish rod 14 to provide an annular chamber 36 therebetween. The chamber 36 is open at the lower end thereof, as viewed in FIG. 2, to the fluid pressure present in the well bore (not shown). A suitable sealing means, such as an O-ring 38 is interposed between the outer periphery of the sleeve 32 and the bore 16 for precluding leakage of fluid therebetween. The outer periphery of the sleeve 34 is reduced at 42 to provide an annular chamber 44 therebetween. At least on, and preferably a plurality of bores 46 are provided in the reduced neck portion 42 to provide communication between the chambers 44 and 36 for a purpose as will be hereinafter set forth.

The upper end of the bore 34 is of an enlarged diameter as shown at 48 to provide an annular shoulder 50 which receives one end of a suitable bushing means 52 thereagainst. Suitable packing means 54 generally similar to the packing means 26 is disposed against the outer end of the sleeve 34 and bushing means 52 and is preferably retained against upward movement upon reciprocation of the polish rod 14 by an inwardly directed shoulder 56 provided on the inner periphery of the bore 16. The outer periphery of the packing means 54 is in engagement with the inner periphery of the bore 16 and the inner periphery of the packing means 54 is in engagement with the outer periphery of the polish rod 14. The characteristics of the structure of the packing means 54 is such that the outer periphery thereof may flex radially inwardly in response to excessive or sufficient pressure of the fluid present in the chamber 44 whereby the fluid is admitted from the chamber 44 into the chamber 17. The packing means 54, however, precluding movement of the fluid from the chamber 17 to the chamber 44.

At least one, and preferably two, radially outwardly extending flanges or ears 62 may be secured to the outer periphery of the housing 12 in any suitable manner, such as by welding, or the like. A longitudinally extending passageway means 64 is provided in the flange 62 and has one end 65 enlarged and open to the exterior of the flange or to the atmosphere. The opposite end of the passageway 64 terminates in a substantially perpendicular passageway 66 which is in communication with a bore 68 provided in the wall of the housing 12. The bore 68 is preferably open to the chamber 17 in the proximity of the lower end of the packing means 26.

The outer end of the enlarged passageway portion 65 may be threaded as shown at 70 for receiving a suitable plug means 72 therein. An annular shoulder 74 is provided at the juncture between the passageways 64 and 65 to provide a valve seat. A valve closure means or ball member 76 is loosely disposed in the passageway portion 65 and cooperates with the valve seat 74 to provide alternate open and closed positions for the passageway 64. Suitable helical spring means 78 is disposed or anchored between the plug means 72 and the ball 76 for constantly urging the ball into engagement with the valve seat 74, thus providing a normally closed position for the passageway 64. A passageway 80 has one end open to the passageway 65 and the opposite end open to a bore 82 provided in the wall of the housing 12. The bore 82 is open to the chamber 44 whereby the well fluid may be communicated to the passageway 65 for a purpose as will be hereinafter set forth.

A monoconvex point means 81 may be secured to the lower end of the packing follower 32 in any suitable manner, such as by welding or the like. The joint 81 is generally similar to that shown in the aforementioned co-pending application and is provided with a central bore 83 for freely receiving the polish rod 14 therethrough. The joint 81 cooperates with a mating monoconcave joint means (not shown) in the manner as set forth in the aforementioned co-pending application and functions in the same manner to permit self-alignment of the stiffing box and/or polish rod between the pump jack (not shown) and the pumping "T" (not shown). The bushings 24 and 52 efficiently center the polish rod 14 within the housing 12.

Figure 3:
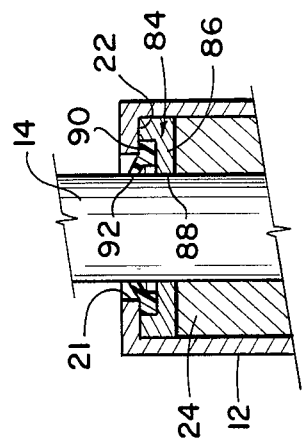
FIG. 3 is a sectional elevational view of a wiper means which may be utilized in a stuffing box embodying the invention.

Referring now to FIG. 3, reference character 84 generally indicates a wiper means which may be interposed between the bushing sleeve means 24 and the shoulder 22, or otherwise utilized in combination with the stuffing box 10 for substantially precluding the entry of undesirably foreign particles into the interior of the stuffing box. As shown herein the wiper means 84 comprises a cup means 86 supported by the upper end of the bushing sleeve 24 and having a central bore 88 for receiving the polish rod 14 therethrough. An annular packing or yieldable wiper member 90 is disposed in the cup means 86 and is provided with a central flexible wiper lip 92 which engages the outer periphery of the polish rod 14. As the polish rod 14 reciprocates with respect to the wiper means 84 the lip 92 flexes upwardly and downward, and maintains a tight engagement with the polish rod for substantially precluding the entry of sand, debris or unwanted foreign particles into the stuffing box 10. Thus, the packing members and polish rod are protected from abrasive damage during the operation of the polish rod.

In use, the stuffing box 10 may be installed at the well head (not shown) and around the polish rod 14 in the usual manner whereby the stuffing box is held stationary and the polish rod is reciprocal with respect thereto. The stuffing box 10 is normally disposed outboard of the usual pumping "T" (not shown). The well fluid being elevated in the well bore (not shown) is normally present in the chamber 36 and is transmitted into the chamber 44 through the bores or ports 46. The well fluid is also transmitted to the passageway 65 through the bore 80 and is present below the normally closed ball valve 76. Of course, the cooling chamber 17 may be precharged with a suitable fluid if desired, or the well fluid is free to enter the chamber 17 around the packing means 54 until such time that the pressure within the chamber 17 is at least equal to the pressure in the chamber 44. When the pressure in the chamber 17 is equal to or somewhat greater than the pressure in the chamber 44, communication between the chambers 17 and 44 will be precluded by the closed valve member 76 and the packing means 52. The ball member 76 will be maintained in engagement with the valve seat 74 by the force of the spring 78 in combination with the pressure in the passageway 65, thus efficiently retaining a supply of fluid in the chamber 17 surrounding the outer periphery of the polish rod 14. It is to be noted that access to the passageway 65 and valve means 76 may be achieved by removal of the plug means 72, and a supply of the lubricant or fluid may be introduced into the chamber 17 through the passageway 64 if precharging of the chamber 17 is desired.

Of course, when the wiper means 84 is included in the upper portion of the stuffing box 10, the outer periphery of the polish rod 14 is constantly wiped by the flexible lip 92. Thus, the outer periphery of the rod 14 is cleaned to preclude the carrying of sand or the like into the interior of the stuffing box during reciprocation of the rod.

Figure 4:
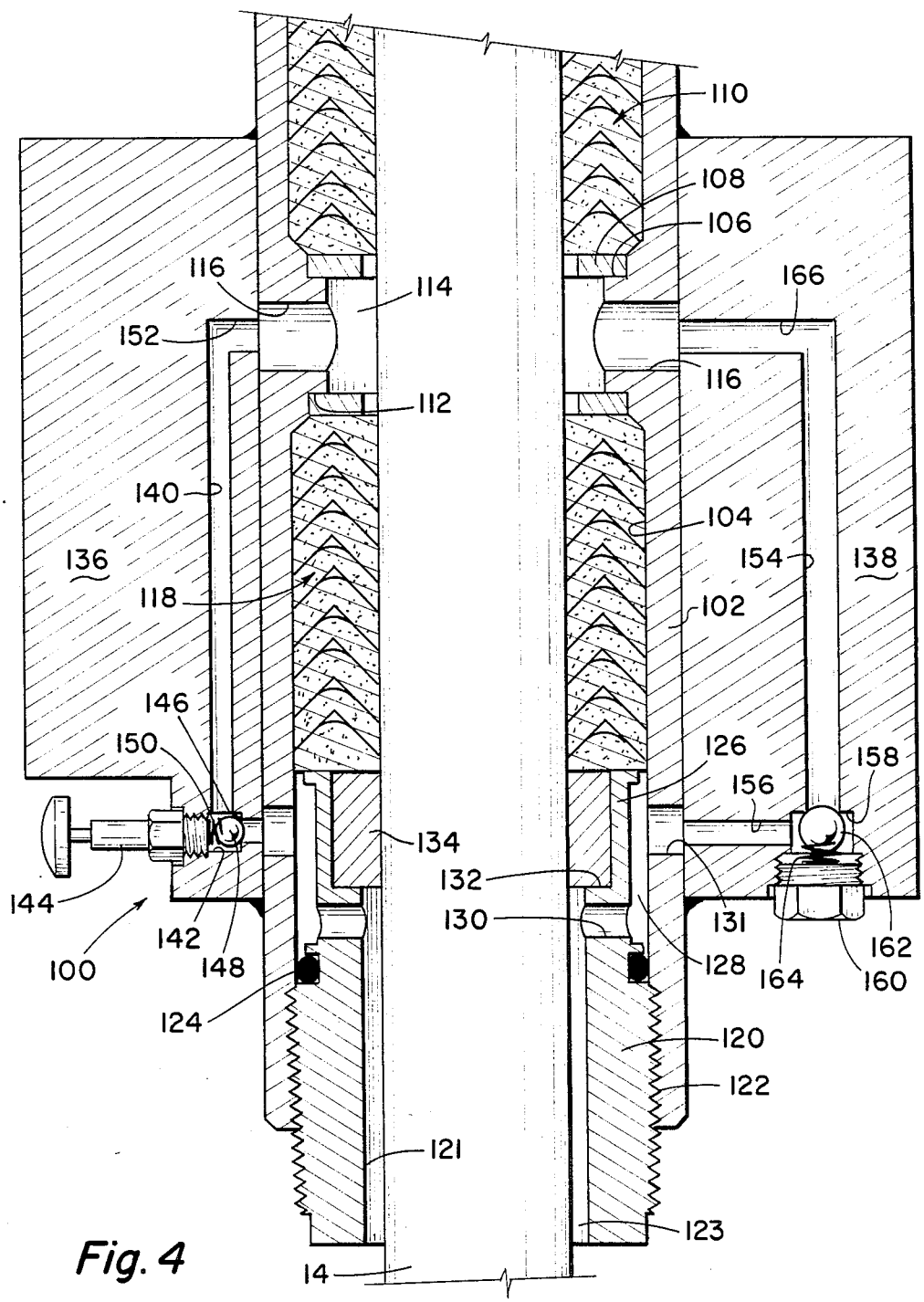
FIG. 4 is a sectional elevational view of a modified lubrication system which may be utilized in a stuffing box embodying the invention.

Referring now to FIG. 4, a modified stuffing box is generally indicated at 100 and comprises a housing or sleeve 102 adapted to be disposed around the outer periphery of the polish rod 14 in the same general manner as the housing 12. The housing 102 is provided with a central longitudinally extending bore 104 concentrically arranged around the outer periphery of the rod 14 and spaced radially outwardly therefrom. A first inwardly directed annular shoulder means 106 is provided on the inner periphery of the bore 104 for receiving an annular ring 108 thereon. The ring 108 supports a packing ring assembly 110 which normally includes a plurality of stacked or superimposed packing rings having the inner periphery thereof in engagement with the outer periphery of the polish rod 14 and the outer periphery thereof in engagement with the inner periphery of the bore 104. The packing rings are preferably of the well known and readily available single lip chevron type packing, but not limited thereto.

A second inwardly directed annular shoulder means 112 is provided on the inner periphery of the bore 104 in longitudinally spaced relation with respect to the shoulder means 106 to provide a cooling chamber 114 therebetween. The cooling chamber 114 surrounds the outer periphery of the rod 14 and is open to at least one and preferably two ports 116 provided in the housing 102 between the shoulders 106 and 112 for a purpose as will be hereinafter set forth. A second packing assembly 118 generally similar to the packing assembly 110 is disposed in the bore 104 below the shoulder means 112 and is supported therein by a packing follower sleeve or gland means 120. The follower means 120 is preferably threadedly secured to one end of the housing 102 as shown at 122 and is provided with a central bore 12 which forms an annular chamber 123 surrounding the outer periphery of the rod 14 and in open communication with the well bore (not shown) for receiving the well fluid therefrom. Suitable sealing means, such as an O-ring 124 may be interposed between the outer periphery of the follower gland 120 and the inner periphery of the bore 104 for precluding leakage of fluid therebetween.

The outer diameter of the follower gland 120 is reduced and 126 to provide an upwardly extending neck which engages and supports the lowermost end of the packing assembly 118. It will be readily apparent that the radial pressure of the engagement of the packing assembly 118 against the outer periphery of the rod 14 and the inner periphery of the bore 104 may be adjusted by the longitudinal position of the follower gland 120 with respect to the housing 102. The position of the gland 120 may be adjusted by the threaded engagement 122 thereof with the housing 102 as is well known. The diameter of the outer periphery of the neck 126 is smaller than the diameter of the bore 104, thus providing an annular chamber 138 therebetween. At least one and preferably a plurality of bores 130 are provided in the neck 126 extending between the chambers 123 and 128 to permit flow of the well fluid into the chamber 128. In addition, at a plurality of bores 131 are provided in the housing and in communication with the chamber 128 for a purpose as will be hereinafter set forth.

The bore 121 is enlarged at 132 to provide an annular shoulder for receiving a bushing sleeve means 134 thereon. The bushing sleeve means 134 may cooperate with the upper end of the neck 128 for supporting the packing assembly 118 thereabove, and engages the outer periphery of the rod 14 for facilitating the reciprocation of the rod with respect to the housing 102, as is well known. As set forth in connection with the stuffing box 10, it is desirable to provide a pair of longitudinally spaced bushing sleeves in the housing 102 and in engagement with the rod 14 for maintaining the longitudinal alignment between the housing and the rod during operation of the polish rod.

A pair of substantially identical radially outwardly extending diametrically opposed flanges 136 and 138 may be secured to the outer periphery of the housing 102 in any suitable manner, such as by welding, or the like. One of the flanges, such as the flange 136, is provided with a longitudinal fluid supply passageway 140 therein having one end open to the atmosphere through a substantially perpendicularly extending bore 142. The outer end of the bore 142 may be threaded for receiving a suitable fitting means 144 therein. The inner end of the bore 142 is open to one of the ports 131 and may be reduced to provide a valve seat 146 for receiving a ball means 148, or the like, thereagainst to provide open and closed positions between the chamber 128 and the bore 142. A suitable helical spring 150 is interposed between the inner end of the fitting 144 and the ball 148 for constantly urging the ball into engagement with the valve seat 146 to provide a normally closed position thereof. The opposite end of the longitudinal passageway 140 terminates at a substantially perpendicularly arranged passageway 152 which is in open communication with one of the ports or bores 116 for a purpose as will be hereinafter set forth.

The other flange 138 is provided with a longitudinal internal passageway 154 having one end open to one of the bores 131 through a substantially perpendicularly extending bore or return fluid passageway 156. The said one end of the passageway 154 is enlarged at 158 to provide a valve seat which is interposed between the passageway 154 and the bore 156. The enlarged bore portion is also open to the atmosphere and may be threaded for receiving a suitable plug means 160 therein. A ball means 162 is loosely disposed in the enlarged bore portion and a suitable helical spring means 164 is interposed between the plug means 160 and the ball member 162 for constantly urging the ball 162 in engagement with the valve seat 158 to provide a normally closed position thereof. The opposite end of the longitudinal passageway 154 terminates in a substantially perpendicularly arranged passageway or bore 166 which is open to one of the bores 116. It will be readily apparent that the chambers 138 and 114 are in selective communication with each other through the internal passageway systems of the flanges 136 and 138.

In use, an adequate supply of fluid may be admitted into the chamber 114 surrounding the rod 14 for assuring an efficient lubrication for the packing assemblies 110 and 118 during reciprocation of the polish rod 14. The chamber 114 may be precharged with the fluid by injecting the fluid through one of the passageways 140 or 154. This may be accomplished by removing the plug means 160 or the fitting 144 whereby the respective valve means may be removed in order that the desired fluid may be injected into the respective passageways for delivery to the chamber 114. As long as the force of the springs 150 and 164 against the respective ball members 148 and 162 is greater than the pressure in the chamber 114, the chamber 114 is sealed. In the event the pressure in the chamber 114 becomes excessive for any reason, or is greater than the force acting against the ball member 162, the fluid from the chamber 114 may be returned to the well bore (not shown) through the passageway 154. Of course, if the well bore fluid pressure which is present in the chamber 128 exceeds the fluid pressure and force of the spring 148 acting on the ball 150, the well fluid will be directed to the chamber 114 through the supply passageway 140.

Referring now to FIGS. 5 and 6, a valving apparatus 170 is shown which may be utilized with either the stuffing box 10 or the stuffing box 100 in the event the internal passageway means is eliminated and external supply and return lines are used in conjunction therewith as shown in the aforementioned Reeves U.S. Pat. No. 3,468,374. The valving apparatus 170 comprises a housing 172 having a first passageway 174 extending therethrough and a secondary passageway 176 extending substantially perpendicularly with respect thereto. The passageway 176 may be threaded at the outer end thereof for suitable connection with the stuffing box housing and in open communication with the cooling chamber thereof.

The passageway 174 may be threaded at the outer end thereof as shown at 180 for connection with a suitable fluid supply line (not shown). The passageway 174 is enlarged at 182 to provide an annular shoulder 184 interposed between the outer end 180 and the passageway 176 as particularly shown in FIG. 6. The shoulder 184 provides a valve seat for a ball means 186 which is loosely disposed in the bore portion 182 whereby alternate open and closed positions may be provided for the bore 174. The enlarged bore portion 182 is threaded at 188 to receive a sleeve means 190 therein. A suitable sealing means, such as an O-ring 192 may be interposed between the outer periphery of the sleeve means 190 and the housing 172 for precluding leakage of fluid therebetween.

The sleeve 190 is provided with a central bore 194 having the outer end thereof threaded at 196 for adjustably receiving a follower member or stem means 198 therein. A suitable helical spring 200 may be anchored between the inner end of the stem means 198 and the ball member 186 for constantly urging the ball member against the valve seat 184 to provide a normally closed position for the passageway 174 with respect to the fluid supply line. Of course, suitable sealing means, such as an O-ring 202 may be interposed between the outer periphery of the stem 198 and the inner periphery of the bore 194 for precluding leakage of fluid therebetween.

When the pressure in the fluid supply line or conduit (not shown) exceeds the force of the spring 200 and the fluid pressure acting on the ball 186, the ball will be removed from engagement with the valve seat 184 and the fluid pressure from the fluid supply line will be delivered to the cooling chamber through the passageway 176. Conversely, as long as the pressure in the cooling chamber combined with the force of the spring means 200 remains greater than the pressure in the fluid supply line, the cooling chamber will be isolated from the fluid supply.

The valving apparatus 170 may also be utilized between the cooling chamber and a fluid return line (not shown) by essentially reversing the installation thereof. In this instance, the bore 180 may be operably connected with the stuffing box housing and in communication with the cooling chamber and the bore 178 may be connected with the fluid return line. In this installation, any time the fluid pressure in the cooling chamber exceeds the force acting against the ball 186 in the closing direction, the valve will be opened for discharge of the fluid into the fluid return line.

In the event it is necessary to positively close the ball 186 against the seat 184 even when excessive pressure is present in the bore 174, the stem 198 may be moved in a direction toward the ball 186 for physical engagement therewith. This positively maintains a closed position of the ball 186 against the seat 184.

From the foregoing, it will be apparent that the present invention provides a novel self-aligning self-lubricating stuffing box for an oil well polish rod wherein a cooling chamber is provided around the outer periphery of the polish rod for facilitating the operation of the stuffing box during reciprocation of the polish rod. Internal passageway means is included within the stuffing box housing for directing the fluid to and/or from the cooling chamber, and in the event external fluid supply and/or fluid return lines are utilized, valving means is provided for facilitating the movement of the fluid to and/or from the cooling chamber. Bushing means is provided within the stuffing box for assuring an efficient axial alignment between the stuffing box housing and the polish rod during reciprocation of the rod, and a swivel connection means is provided for overcoming or correcting of any misalignment between the pump jack and the pumping "T" during a well fluid delivery operation.

Whereas the present invention has been described in particular relation to the drawings attached hereto, it should be understood that other and further modifications, apart from those shown or suggested herein may be made within the spirit and scope of this invention.

What is claimed is:

1. A stuffing box for a movable polish rod within a well bore associated with a reciprocating downhole pump for producing fluid from a fluid reservoir, said stuffing box comprising housing means secured around the outer periphery of the polish rod and concentrically arranged with respect thereto such that said polish rod passes through said housing, an internal cooling chamber provided in the housing and in engagement with the outer periphery of the polish rod, packing means provided in the housing and disposed at the upper and lower ends of the cooling chamber, fluid passageway means providing communication between the cooling chamber and the interior of the housing below the lowermost packing means for establishing communication between the cooling chamber and the well bore for circulating fluid therebetween, and valve means provided in the passageway means for automatically establishing the communication between the cooling chamber and fluid reservoir as required during reciprocation of the polish rod.

2. A stuffing box as set forth in claim 1 and including bushing means interposed between the housing means and the rod for assuring an axial alignment therebetween during reciprocation of the polish rod.

3. A stuffing box as set forth in claim 2 wherein the bushing means comprises a pair of longitudinally spaced sleeve means interposed between the inner periphery of the housing and the outer periphery of the rod for maintaining said axial alignment therebetween.

4. A stuffing box as set forth in claim 1 and including swivel connection means for providing a self-aligning of the rod during movement thereof.

5. A stuffing box as set forth in claim 1 wherein the fluid passageway means comprises at least one internally disposed longitudinally extending passageway having one end thereof in communication with the cooling chamber and the opposite end thereof in communication with the well bore for receiving fluid therefrom, and the valve means is disposed between the opposite ends of the longitudinal passageway means for alternately opening and closing the communication between the fluid reservoir and the cooling chamber through the longitudinal passageway.

6. A stuffing box as set forth in claim 5 wherein the valve means is normally closed for precluding passage of fluid between the cooling chamber and the well bore.

7. A stuffing box as set forth in claim 6 and including yieldable means constantly urging the valve means toward the closed position thereof and responsive to pressure differentials acting across the valve means for opening thereof to establish fluid communication between the cooling chamber and the fluid reservoir.

8. A stuffing box as set forth in claim 5 and including bore means providing communication between the exterior of the stuffing box and longitudinal passageway for access to the passageway when required.

9. A stuffing box as set forth in claim 1 wherein the passageway means comprises a first passageway means having one end in communication with the cooling chamber and the opposite end thereof in communication with the well bore for selective circulation of fluid therebetween, and a second passageway means having one end in communication with the cooling chamber and the opposite end thereof in communication with the well bore for selective circulation of fluid therebetween.

10. A stuffing box as set forth in claim 9 wherein the first of said passageway means is a fluid supply passageway means, and the second of said passageway means is a fluid return passageway means.

11. A stuffing box as set forth in claim 9 wherein valve means is provided in both the first and second passageway means for automatic control of the fluid flow through the respective passageway means.

12. A stuffing box as set forth in claim 1 and including wiper means carried by the housing means and engagable with the outer periphery of the polish rod for precluding accidental entry of foreign particles into the interior of the housing during movement of the rod.

13. Valving means for a stuffing box of a reciprocal polish rod that passes through said stuffing box within a well bore associated with a reciprocating downhole pump for producing a fluid supply from a fluid reservoir, the valving means comprising passageway means providing communication between a fluid supply in an internal chamber of the stuffing box for circulation of fluid therebetween, and normally closed valve means interposed in the passageway means and responsive to pressure differential acting thereon for automatically opening and closing for control of fluid circulation between the fluid supply and the internal chamber.

14. Valve means as set forth in claim 12 wherein the passageway means is internally disposed within the stuffing box.

15. Valve means as set forth in claim 12 wherein the valve means comprises a valve seat, ball means engagable with the valve seat to provide alternate open and closed positions for the valve means, and yieldable means engagable with the ball means for constantly urging the ball into engagement with the valve seat means to provide a normally closed position for the valve means.

16. Valve means as set forth in claim 15 and including stem means cooperating with the yieldable means for adjusting the pressure of the yieldable means against the ball means and selectively physically engagable with the ball means to provide a positive closing thereof regardless of pressure differentials acting across the ball means.

* * * * *